United States Patent [19]

Nakamura

[11] Patent Number: 5,269,230
[45] Date of Patent: Dec. 14, 1993

[54] JOINT-AND-BEAM PLATFORM

[75] Inventor: Keiichi Nakamura, Shizuoka, Japan

[73] Assignee: Yazaki Industrial Chemical Co. Ltd., Shizuoka, Japan

[21] Appl. No.: 909,741

[22] Filed: Jul. 7, 1992

[51] Int. Cl.5 ............................................. B65D 19/12
[52] U.S. Cl. .................................... 108/56.3; 108/153; 403/231; 403/263
[58] Field of Search ..................... 108/51.1, 56.3, 153; 403/231, 233, 263, 260; 280/47.34, 79.11

[56] References Cited

U.S. PATENT DOCUMENTS

| | | | |
|---|---|---|---|
| 2,774,609 | 12/1956 | Winger | 280/79.11 |
| 4,242,969 | 1/1981 | Checkwood et al. | 108/153 |
| 4,269,532 | 5/1981 | Sorrentino | 403/233 |
| 4,701,065 | 10/1987 | Orosa | 403/263 |

FOREIGN PATENT DOCUMENTS

| | | | |
|---|---|---|---|
| 2596718 | 10/1987 | France | 280/79.11 |
| 1582664 | 1/1981 | United Kingdom | 403/231 |
| 2212879 | 8/1989 | United Kingdom | 403/231 |

Primary Examiner—Clifford D. Crowder
Assistant Examiner—Michael A. Neas
Attorney, Agent, or Firm—Eric P. Schellin

[57] ABSTRACT

A joint-and-beam platform structure is disclosed, which is dismountably built by coupling resin-coated metal beams or members with synthetic-resin joints having hollow sleeves into which ends of the beams are inserted to form a square or rectangular framework. Each joint comprise a pair of first and second sleeves, formed to extend at predetermined angles with each other, each of a cross-section largely shaped like the alphabet "B" to fittingly but removably receive therein a tubular beam of a similarly B-shaped cross-section. The tubular beams are each provided with screw holes in the middle of their curved circumferences to receive screws through aligned screw holes formed in the associated hollow sleeves of the joint. When the tubular beams are inserted into position in the sleeves, the screws are removably engaged through their screw holes into internally threaded holes of a nuts plate that are shaped to follow the contour of the outside periphery of the sleeve and fitted against the outer wall of the sleeve at a point where the twin bulges of the sleeve of B-shaped cross-section slope into a trough between them. The nuts plate may preferably be made to have a wide abutting face so that, when it is pressed against the outer wall of the sleeve, it can closely straddle a wide area of the latter's doubly curved circumference, providing stout engagement.

2 Claims, 3 Drawing Sheets

JOINT-AND-BEAM PLATFORM

BACKGROUND OF THE INVENTION

1) Field of the Invention:

This invention relates to a joint-and-beam platform structure which can be dismountably built by coupling resin-coated tubular metal beams with joints made of a synthetic resin material.

2) Description of the Prior Art:

A great number of platform or framework structures for dismountably assembled trolleys and other implements have been developed, which are built by coupling resin-coated tubular metal beams or members with joints made of a synthetic resin material. Each joint has hollow sleeves, formed at angles with respect to each other, into which end portions of tubular beams are inserted to form an angle between the beams. Normally, the joints in these structures may be T-joints or L-shaped to provide a pair of hollow sleeves extending at right angles. A rectangular framework can be dismountably built by assembling four tubular beams with L-shaped joints into a shape in which the beams have their both end portions inserted into the hollow sleeves of the joints. Joints may be V-shaped where tubular beams are inserted into hollow sleeves formed at wider or narrower angles to build a different shape. Inserted beams are secured in fixed position in their hollow sleeves with tapping screws, that are threaded into the tubular beams through screw holes pre-drilled in the associated hollow sleeves.

However, these conventional dismountable joint-and-beam platform structures posed a number of problems. First, when resin-coated tubular metal beams are assembled with joints into a structure, thrusting tapping screws through the sleeves into the inserted tubular beam is a cumbursome task. Furthermore, when the structure is being disassembled, rust developed in the screw holes drilled in metal members hamper easy unscrewing, despite the originally supposed assurance of easy dismountability.

In addition, the design of these conventional joints are such that their hollow sleeves are made to receive therein a tubular beam of a round cross-section. Therefore, the structures thus assembled, while lightweight, rather lack in durability and are unable to withstand heavy loading, not suitable for the base platform of heavy duty equipment trolleys. For some structures intended for carrying heavy loads, the whole build need to be rigid enough to meet the desired purposes.

The present invention has been proposed to solve the above-mentioned problems found with conventional devices.

SUMMARY OF THE INVENTION

A primary objective of the present invention is to provide a platform built for dismountable trolleys and other similar structures, which is built from joints made of a synthetic resin and coated tubular metal beams or members inserted into hollow sleeves in the joints, which provides for easier assembly and disassembly for maintenance than possible with conventional devices.

Another objective of the invention is to provide such a platform constructed from joints that are designed to have hollow sleeves formed to receive therein tubular beams of a largely B-shaped cross section, thereby giving the assembled structure increased rigidity enough to withstand heavier loads.

The above and other objects, features and advantages of the present invention are provided by a joint-and-beam framework structure built by coupling resin-coated metal beams or members with synthetic-resin joints having hollow sleeve into which ends of the beams are inserted to form a square or rectangular framework. Each joint comprises a pair of first and second sleeves, formed to extend at predetermined angles with each other, each of a cross-section largely shaped like the alphabet "B" designed to fittingly but removably receive therein an end portion of a tubular beam or member of similarly B-shaped cross-section. The tubular beams are each provided with screw holes in the middle of their curved circumferences to receive screws through aligned screw holes formed in the associated hollow sleeves of the joint. When the tubular beams are inserted into position in the sleeves, the screws are removably engaged through their screw holes into internally threaded holes of a nuts plate that are shaped to follow the contour of the outside periphery of the sleeve and fitted against the outer wall of the sleeve at a point where the twin bulges of the sleeve of B-shaped cross-section slope into a trough between them. The nuts plate may preferably be made to have a wide abutting face so that, when it is pressed against the outer wall of the sleeve, it can closely straddle a wide are a of the latter's curved circumference, providing stout engagement.

A joint may have at least one hollow sleeve to permit a pair of parallely extending tubular beams, not a single beam along as in the earlier embodiment mentioned above, to make a structure sided with double beams, thereby providing increased rigidity.

In another modification, the joint is T-shaped, where the first hollow sleeve is perpendicularly formed to the middle of the second hollow sleeve. A tubular beam of B-shaped cross-section is inserted into the first hollow sleeve and secured by screws that are inserted through aligned screw holes in the sleeve and inserted beam and removably engaged into threaded holes in a nuts plate that is sized to be snugly fitted into the elongate trough formed between the twin circumferential bulges of the sleeve of B-shaped cross-section.

DETAILED DESCRIPTION OF PREFERRED EMBODIMENTS

Preferred embodiments of the present invention will be described in full detail in conjunction with attached drawings.

Figure 1:
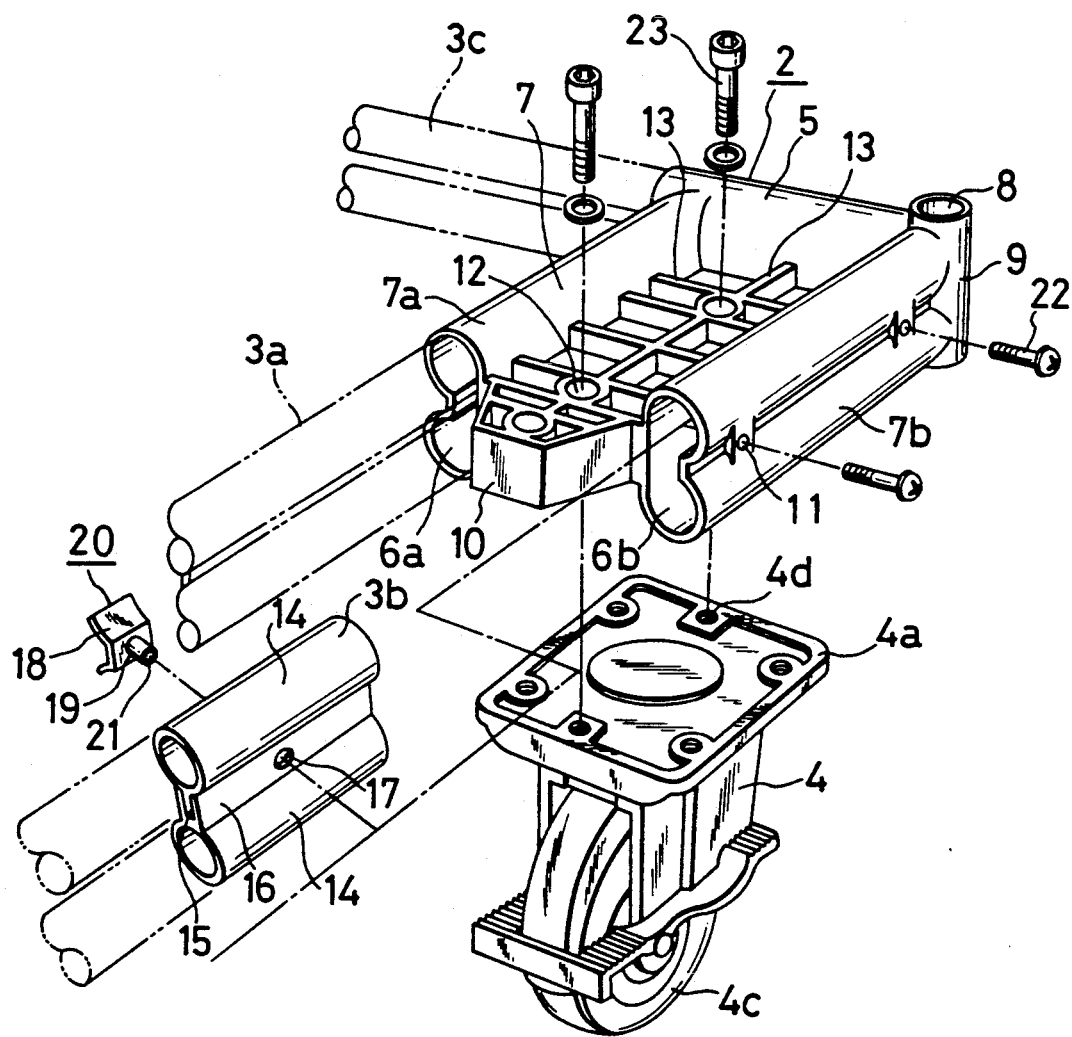
FIG. 1 is an exploded perspective view of the base framework of an equipment trolley built by coupling tubular beams with joints with hollow sleeves according to a first embodiment of the present invention, showing only a corner of the trolleys.

Referring to FIG. 1, which is an exploded perspective view of a part of the base platform of a trolley mounted on casters 4 for wheeling, the platform, 1 may be a largely rectangular framework of elongate resin-coated tubular crossbeams build to form the four sides of the framework and dismountably coupled at opposite ends thereof by an L-shaped joint at each corner of the base platform. The figure only shows, for brevity's sake, one corner of the base platform 1 where tubular cross-beams intersect at right angles with respect to each other above a caster 4, with the ends of the tubular cross-beams coupled by a joint 2.

The joint 2 may be made of a plastic material, such as polyethylene terephthalate, manufactured by injection forming. Also, the joint 2 includes a pair of parallelly extending first and second sleeve portions 7a and 7b and a third sleeve portion 5 formed to extend perpendicularly with the paired sleeve portions 7a and 7b.

The first sleeve portion 7a is made hollow to provide an axial mouth 6a into which an end portion of a first tubular cross-beam 3a of a cross-section shaped like the alphabet "B" is removably inserted. Likewise, the second sleeve portion 7b has an axial hollow 6b to receive therein an end portion of a second cross-beam 3b. The first and second tubular cross-beams 3a and 3b constitutes one of the four sides of the rectangular base platform 1. In addition, the third sleeve portion 5 on is also formed to have an axial hollow, not shown, into which an end portion of a third tubular cross-beam 3c, which has a configuration similar to the first cross-beam 3a also removably fits into. The third cross-beam 3c forms one of the four sides of the platform base 1.

Also, the joint 2 has a mounting plate 10, which is secured in fixed position at one end to a longitudinal circumference of the third sleeve portion 5. The mounting plate 10 is fixedly secured along both longitudinal sides to a circumference of the first and second sleeve portions 7a and 7b. The mounting plate 10 may have screw holes 12 through which the caster 4 is fixed to the bottom side of the base platform 1 with screws 23.

The second sleeve portions 7b may preferably be provided along a longitudinal circumference thereof with a pair of screw holes through which screws 22 fix the second cross-beam 3b inserted into the second hollow 6b. Likewise, the first and third sleeve portions 7a and 5 are provided along a circumferential portion thereof screw holes, not shown, for securing the inserted cross-beams 3a and 3c, respectively through screws, not shown.

Also, a vertically extending tubular portion 8 is formed, which is secured to the joint 2 where the second sleeve portion 7b meets with the third sleeve portion 5. The mounting plate 10 is provided on both front and back surfaces thereof reinforcing ribs 13 formed in axially symmetrical lattice. The mounting plate 10 may preferably be designed in terms of shape and structure so that it can also be used to hold a caster at other corners of the base platform 1. For example, at the opposite end of the paired sleeve portions 7a and 7b where they abut against a coupler similar to the joint 1, a caster mounting plate is mounted the other side up.

Each of the first and second tubular cross-beams 3a and 3b may preferably be sized to have a diameter ranging between 28 and 32 millimeters and thin-walled, externally coated with a synthetic resin, such as AAS. In addition, each cross-beam 3a, 3b, 3c may preferably be composed of a pair of tubular members 14 made integral to each other through a pair of parallelly extending first and second strip members 15 and 16, that run along the full length of the associated cross-beam where the twin bulges of the cross-beam of B-shaped cross-section slope into a trough between them. Also, the strips 15 and 16 may preferably be coated with a resin, and have along their longitudinal length with a pair of aligned screw holes 17, one of which is shown for brevity's sake. The screw holes 17 are situated so that they are aligned with the paired screw holes 11 when the cross-beam 3a, 3b, 3c are inserted into position in the associated hollow sleeve portion 7a, 7b, 5. For each screw hole 17, a goose-wing nut 20 having a lock 19 is provided to receive the screw 11 which is inserted through the aligned associated screw hole 11 into the internally threaded lock 9 of the nut to fix the cross-beam, 3a, 3b, 3c. With this arrangement, the base platform 1 is built by assembling identically shaped joints and cross-beams, and mounting plates with screws, so that they can easily be dismembered. Therefore, if individual members are irrecoverably disfigured or broken, they can be replaced with similar parts. In addition, using a longer or shorter cross-beam that is substantially similar in design to the cross-beam 3a, 3b, 3c except for the length, the base platform can have a larger or smaller dimension.

The caster 4 may preferably made of a plastic material similar to the joint 2, and include a bracket portion 4a formed above a swivelling wheel 4c. The bracket portion 4a may preferably be centrally formed with a pair of screw holes 4d through which the caster 4 is dismountably secured to the bottom surface of the mounting plate 10 by the screws 23 through the aligned screw holes 12 in the mounting plate 10.

Figure 2:
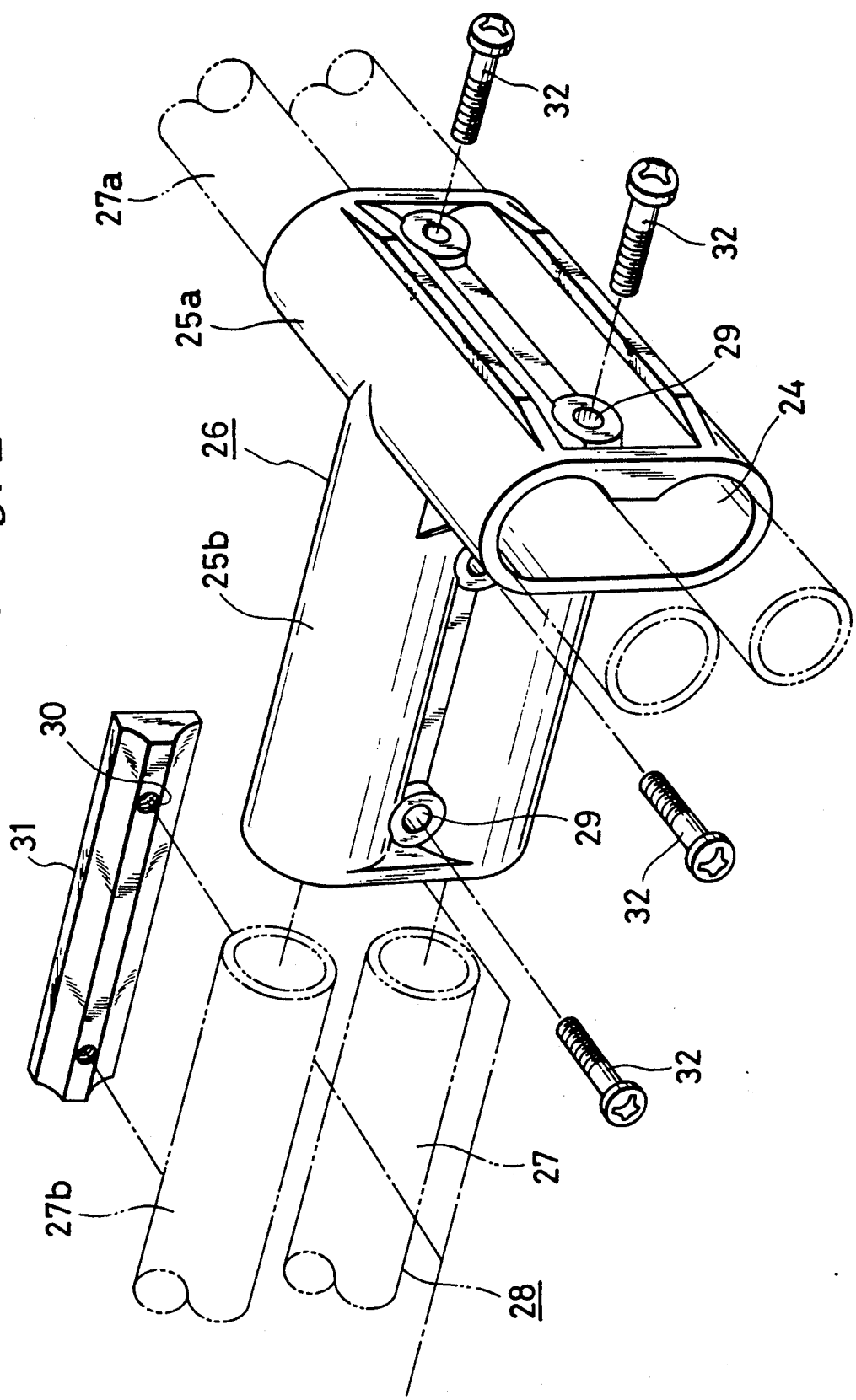
FIG. 2 is an exploded enlarged perspective view of the structure of coupling by a joint and beams according to a second preferred embodiment of the present invention.

Referring to FIG. 2, a second embodiment of the present invention is a T-shaped joint 26 which comprises a first sleeve 25a of having an axial hollow 24 of a cross-section shaped like the alphabet B designed to fittingly receive therein a cross-beam 27a of a similarly B-shaped cross-section and a second hollow sleeve 25b made integral to the middle of the first sleeve 25a and also having a B-shaped cross-section into which a cross-beam 27b, which has a substantially identical configuration to the cross-beam 27a, is inserted.

A nuts plate 31 is provided, which has along its length a pair of threaded holes 30 into which a pair of screws 32 are inserted through aligned screw holes formed in the first sleeve 25a and the cross-beam 27a that is inserted into the sleeve. The nuts plate 31 has one surface formed to follow the contour of the doubly curved external circumference of the sleeve of B-shaped cross-section 27b, so that the plate can be abutted in close contact against the wall of the sleeve between its twin bulges. The cross-beam 27a is also removably secured in the hollow sleeve 25a with a pair of screws 32 that go through aligned screw holes drilled in the sleeve and cross-beam.

The nuts plate 31 must be sized to have a longitudinal length substantially equal to shorter than the axial length of the hollow sleeve 25b.

Figure 3:
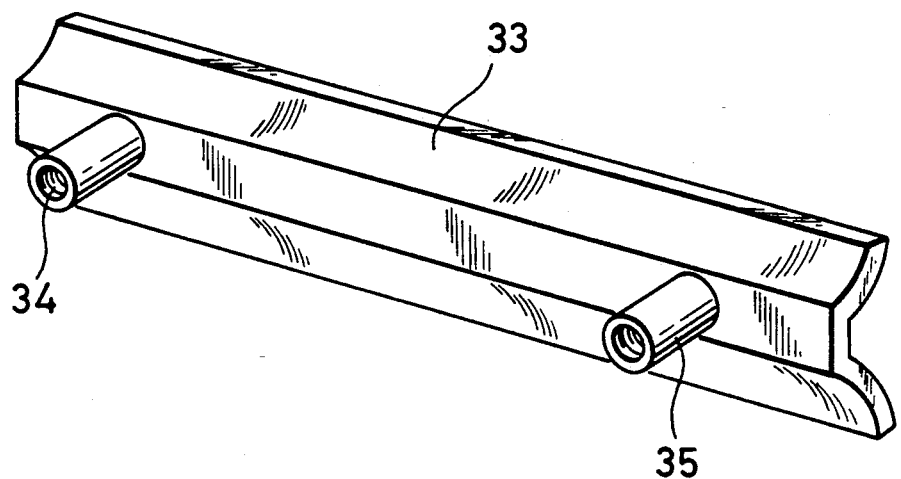
FIG. 3 is a perspective view of a nuts plate used for the joint-and-beam platform illustrated in FIG. 2.

With respect to FIG. 3, a goose-wing nut 33 may be used instead of the nuts plate 31, which has a pair of internally projected portions 35 for insertion into the screw holes in the sleeve 25b and cross-beam 27b. The projected portions 35 each has an internally threaded hole 34 into which the screws 32 are engaged.

Although the preferred embodiments are described with respect to joint structures where tubular beams are assembled at right angles, the present invention should also be applied to coupling tubular beams at wider or narrower angles with respect to each other as in V-shaped or L-shaped joints.

It will be clear from the above description that the present invention provides a joint which does not cause corrosion problems, because screws are engaged into threaded holes formed in nuts made of a synthetic resin material. In addition, all screw holes for securing a tubular metal beam to the associated sleeve of a joint, are pre-drilled so that any person can assemble a structure.

In addition, screws are secured in the trough defined between the twin circumferential bulges of the sleeve of B-shaped cross-section, the structure assembled eliminates the inconvenience of conventional joints where the screws stand out externally from the periphery of the sleeve into an unwanted projection.

What is claimed is:

1. In a joint-and-beam platform structure which is dismountably assembled from L-shaped joints made of a synthetic resin and having at least a pair of hollow sleeves formed at right angles with respect to each other and resin-coated tubular metal beams having end portions thereof inserted into the sleeves to form an L-shaped coupling, the improvements comprising each joint having hollow sleeves formed to have a largely B-shaped cross-section, each tubular beam formed to also have a generally B-shaped cross-section for snugly insertion into the hollow sleeve of the joint so that at least two tubular beams are coupled perpendicularly, with end portions thereof inserted in the hollow sleeves of the L-shaped joint to form a corner of the platform, a pair of parallel strips secured to each side of the tubular beam along its entire length along a longitudinal trough defined between twin circumferential bulges of the tubular beam of B-shaped cross-section, a nuts plate provided to secure in conjunction with screws the tubular beam inserted into the hollow sleeve, the nuts plate being formed in one surface to follow the contour of a curved internal circumference of the hollow sleeve for close contact therewith and having therein internally threaded holes into which the screws are inserted through aligned screw holes formed in the sleeve and the strips of the tubular beam.

2. In a joint-and-beam platform structure which is dismountably assembled from T-shaped joints made of a synthetic resin and resin-coated tubular metal beams, each joint having at least a pair of a first hollow sleeve and a second hollow sleeve formed perpendicularly to a central peripheral portion of the first sleeve in which the tubular beams have end portions thereof inserted into the first and second hollow sleeves to form a T-shaped coupling, the improvement comprising each of the first and second hollow sleeves has a largely B-shaped cross-section, each tubular beam formed to have a largely B-shaped cross-section for fitting insertion into the hollow sleeves of the joint, a pair of parallel strips secured to each side of the tubular beam along its entire length along a longitudinal trough defined between twin bulged external peripheries of the tubular beam of B-shaped cross-section, a nuts plate provided to secure the tubular beam to the second hollow sleeve in conjunction with screws, the nuts plate being formed in one surface to follow the contour of the curved second hollow sleeve for close contact therewith and having therein internally threaded holes into which the screws are inserted through aligned screw holes formed in the second hollow sleeve and the strips, the nuts plate being sized to have a length substantially equal to or shorter than the second hollow sleeve.

* * * * *